US006801885B1

(12) United States Patent
Henry

(10) Patent No.: US 6,801,885 B1
(45) Date of Patent: Oct. 5, 2004

(54) PROCESS FOR SYNTHESIZING A DATABASE FOR NUCLEAR POWER PLANT CONTAINMENT EVALUATION

(75) Inventor: Robert E. Henry, Naperville, IL (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 772 days.

(21) Appl. No.: 09/677,899

(22) Filed: Oct. 3, 2000

Related U.S. Application Data
(60) Provisional application No. 60/157,888, filed on Oct. 5, 1999.

(51) Int. Cl.[7] .................................................. G06G 7/54
(52) U.S. Cl. ............................ 703/18; 700/79; 376/216; 376/245
(58) Field of Search ............................... 703/18, 2, 13, 703/6; 376/216; 706/915; 976/DIG. 207; 700/79; 776/245

(56) References Cited

U.S. PATENT DOCUMENTS

| | | | |
|---|---|---|---|
| 4,632,802 A | * | 12/1986 | Herbst et al. ............... 376/216 |
| 4,740,349 A | | 4/1988 | Loftus et al. |
| 4,754,410 A | | 6/1988 | Leech et al. |
| 4,957,690 A | | 9/1990 | Fennern |
| 4,961,898 A | * | 10/1990 | Bogard et al. ............... 706/915 |
| 5,107,497 A | | 4/1992 | Lirov et al. |
| 5,311,562 A | * | 5/1994 | Palusamy et al. ........... 376/216 |
| 5,544,308 A | | 8/1996 | Giordano et al. |
| 5,623,109 A | * | 4/1997 | Uchida et al. ............. 73/865.9 |
| 5,732,397 A | | 3/1998 | DeTore et al. |
| 5,859,885 A | * | 1/1999 | Rusnica et al. ............. 376/216 |
| 5,999,923 A | | 12/1999 | Kowalski et al. |
| 6,061,412 A | | 5/2000 | Stucker et al. |

OTHER PUBLICATIONS

Dehbi, A.A. et al., "Condensation Experiments in Steam–Air and Steam–Air–Helium Mixtures Under Turbulent Natural Convention," *Heat Transfer*, pp. 19–28, 1991.

Epstein, M., "Buoyancy–Driven Exchange Flow Through Small Openings in Horizontal Partitions," *Transactions of the ASME Journal of Heat Transfer*, vol. 110, pp. 885–893, Nov. 1988.

Epstein, M. et al., "Combined Natural Convection and Forced Flow Through Small Openings in a Horizontal Partition, with Special Reference to Flows in Multicompartment Enclosures," *Transactions of the ASME Journal of Heat Transfer*, vol. 111, pp. 980–987, Nov. 1989.

Lee, Sung Jin et al., "Benchmark of the Heiss Dampf Reaktor E11.2 Containment Hyrdogen–Mixing Experiment Using the MAAP4 Code," *Nuclear Technology*, vol. 125, pp. 182–196, Feb. 1999.

Ricou, F.P. et al., "Measurements of Entrainment by Asixymmetrical Turbulent Jets," pp. 21–32, Nov. 1960.

* cited by examiner

*Primary Examiner*—Albert W. Paladini

(57) ABSTRACT

A method of evaluating a containment building design includes the steps of assembling a first database of test results; selecting models (algorithms) for the design to be evaluated; comparing a first set of test results of the model to test results in the first database of test results; establishing uncertainty boundaries for the first set of test results of the model; assembling a second database of test results; determining whether the test results of the second database are within the uncertainty boundaries of the model; and evaluating an actual or proposed containment building design based upon the model when test results of the second database are within the uncertainty boundary.

10 Claims, 3 Drawing Sheets

PROCESS FOR SYNTHESIZING A DATABASE FOR NUCLEAR POWER PLANT CONTAINMENT EVALUATION

CROSS REFERENCE TO RELATED APPLICATION

This application claims the benefit of Provisional Application Ser. No. 60/157,888, filed Oct. 5, 1999.

BACKGROUND OF THE INVENTION

This invention relates to methods for evaluating designs of products, and more particularly, to methods for evaluating nuclear power plants and components therein.

Nuclear power plants include a containment structure that houses the nuclear reactor portion of the plants. Throughout the development of the nuclear power industry, a large number of key experiments have been performed which characterize various aspects of nuclear power plant containment structure performance under postulated accident conditions. These experiments include such large scale tests as: the Marviken suppression pool dynamics test program; the Carolinas-Virginia Tubular Reactor (CVTR) containment experiments; extensive HDR full scale containment experiments; the Containment Systems Test Facility (CSTF) experiments; the Battelle-Frankfurt containment compartmentalization tests; and the NUPEC containment experiment that has been characterized as an International Standard Problem (ISP-35).

These numerous experiments provide key data and insights related to the containment structure performance under a variety of postulated accident conditions. These data and insights specifically relate to those features of the containment structure that would influence radioactive releases to the environment assuming a Design Basis Accident (DBA) leakage rate. Furthermore, these data, combined with more numerous separate effects experimental data, characterize individual aspects of the different containment designs that have been used throughout the United States, Europe and the Far East. Separate effects tests are those limited scale experiments that are generally well instrumented but focus on a specific physical process (phenomenon) such as condensation. Large scale tests approach the size of a containment building and include all the relevant physical processes, i.e. condensation, natural circulation, compartmentalization, containment sprays, etc.

To date, individual experiments have been compared to a variety of approaches for designing and evaluating containments with respect to their licensing basis, which includes the releases of radioactive fission products due to the design basis leakage rate. However, no uniform process has been established to synthesize the huge amount of experimental data available from these large scale containment experiments and additional small scale separate effects experiments in a technically defensible manner such that the ensemble of the data can be used to evaluate the performance of given containment designs. Furthermore, no methodology has ever synthesized this database across a spectrum of containment designs such that the technical bases for decision making is uniform for all designs. The various types of nuclear power plant containments include those used for Boiling Water Reactors (BWRs), specifically the Mark I, Mark II and Mark III containment designs, as well as for the Pressurized Water Reactor (PWRS) which include large dry, subatmospheric and ice condenser containment designs.

It would be desirable to have a uniform method for the evaluation of a product design that uses the data resulting from various independent tests and simulations of various aspects of the product. More particularly, it would be desirable to have a uniform method for the evaluation of nuclear reactor containment structures that uses data resulting from various large scale experiments and separate small scale separate effects experiments relating to such containment structures.

SUMMARY OF THE INVENTION

This invention provides a structured method of evaluating a design and includes the steps of assembling a first database of test results; selecting physical models relevant for the design to be evaluated; comparing a first set of test results of these models to test results in the first database of test results; establishing uncertainty boundaries for the first set of test results of the models; assembling a second database of test results; determining whether the test results of the second database of test results are within the uncertainty boundaries of the model; and evaluating an actual or proposed design based upon the resulting models when test results of the second database of test results are within the uncertainty boundary.

If the second data base test results are not within the uncertainty boundaries of the model, the process of assembling the first database and selecting the relevant physical models is repeated and adjusted so that the test results of the second database will fall within the uncertainty boundaries of the resulting integral model. This forces closure of the process. The physical models are mathematical models (algorithms) that are used to model the design, or components thereof, that is under evaluation.

DESCRIPTION OF THE PREFERRED EMBODIMENT

The method of this invention is referred to as the "5 Step Structured Treatment for Analytical Representations" or simply the 5 SSTAR process. The preferred embodiment of the invention will be described with respect to the evaluation of nuclear power plant containment structures. However, it should be understood that the invention is applicable to the evaluation of other products as well.

Figure 1:
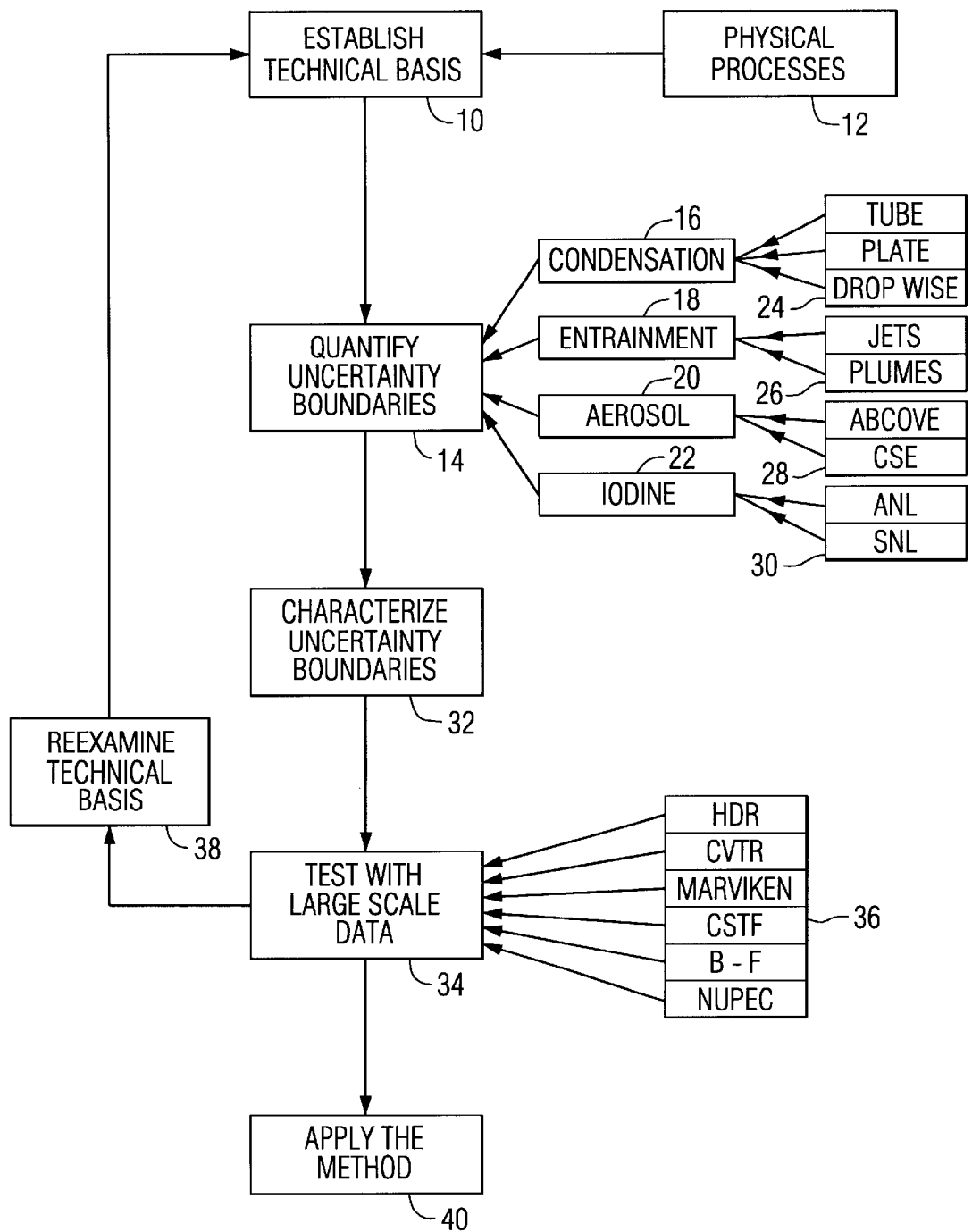
FIG. 1 is a flow diagram that illustrates the method of the present invention.

Referring to the drawings, FIG. 1 is a flow diagram that illustrates the method of the present invention. The first step in the process, as illustrated in block 10, is the establishment of a technical basis for the evaluation. This is done through the identification of the major physical processes, as shown in block 12, that will serve as the basis for the subsequent technical evaluation of the product design to be evaluated. For example, in the evaluation of a containment structure in a nuclear power plant, such processes include: condensation, entrainment, aerosol behavior, recirculation flows, and iodine chemical state. Once the relevant physical processes have been identified, the uncertainty boundaries of the parameters associated with those processes are quantified as shown in block 14. The parameters are obtained from relevant experiments that have been previously reported in the relevant technical literature. Blocks 16, 18, 20 and 22 represent the relevant parameters that can be applied in the evaluation of a nuclear reactor containment structure. Values for these parameters are obtained from previously conducted experiments that relate to the physical processes as shown in blocks 24, 26, 28 and 30. In the step illustrated in block 14, a comparison is made of the results of these individual experiments with physical models (algorithms) published in the open literature (and proprietary literature where available). For example, algorithms published to represent steam condensation is the presence of noncondensible gases are evaluated through this invention. The result is that publsihed algorithms, or a new modified algorithm, is demonstrated to be sufficient to represent this phsyical process in a containment building including the influences of experimentally observed uncertainties. The uncertainty boundaries are obtained by comparing published algorithms, or modified algorithms, with the spectrum of identified relevant experimental evidence. For example, when evaluating an algorithm describing (modeling) steam condensation in the presence of noncondensible gases, some of the relevant separate effects experiments to evaluate (test) the applicability of the algorithms are those of Uchida (Proc. Int. Conf. Peaceful Uses of Atomic Energy, 13, 93, 1965), Tagami (Japanese Atomic Energy Research Agency, unpublished work, 1965) and Dehbi et al. (AlChE Symposium Series, Heat Transfer, Minneapolis, No. 283, Vol. 87, 1991).

The uncertainty boundaries are then characterized as shown in block 32 into one of several categories, such as best estimate, pessimistic, optimistic, high or low. Through this comparison, the method of this invention develops a characterization of the uncertainty spectrum that must be included for each model to assure that individual models properly represent the spectrum of experimental information included in the first step of cataloguing of physical processes. In the preferred embodiment of the invention as applied to the evaluation of containment structures, the information developed from separate effects and integral tests, which is confirmed through comparisons with large scale containment experiments is characterized for individual phenomena in terms of five different conditions: best estimate, optimistic/low, optimistic/high, pessimistic/low, and pessimistic/high. In this sense the integral tests are the most meaningful and demanding comparisons since these include all of the relevant phenomena are present in the same manner that they would exist (and co-exist) in a nuclear power plant containment building.

For these evaluations, the best estimate is self-explanatory in terms of the model parameters developed from comparisons with the experimental results (data). In the application of this invention to a containment building of a nuclear power plant, pessimistic boundaries are those uncertainty boundaries for model parameters that would tend to increase the containment pressure and/or the fission product release from containments as analyzed for the design basis (DBA) evaluations. Optimistic boundaries are those uncertainty boundaries that would clearly decrease the containment pressure and/or the fission product releases from the containment.

It is also likely that there will be model parameters, which are not clear in terms of their influence on the containment pressure or fission product releases from the containment. Specifically, these elements may have complex interactions during the evaluation which tend to cause some aspects to be pessimistic and others to be optimistic. Given this ambiguous condition, these parameters are then considered as high and low values where the high is simply the largest value of the model parameter justified by the comparisons with the results from the separate effects and integral tests with the low value being the lowest magnitude of the model parameter resulting from these comparisons with experimental measurements (data processing).

Through this uncertainty evaluation, the five different categories are used in the method to characterize the uncertainty boundaries resulting from the data processing, which are to be used in assessing the containment response. This provides an integral method for representing a synthesis of the vast amount of small scale and large-scale experimental data into the containment assessment. Furthermore, this provides for a synthesis of the integral information available for a given containment design and the net result of the uncertainties associated with the individual processes which make up the integral evaluation.

After the uncertainty boundaries have been characterized, a comparison is made of the calculated integral response for the combined physical processes with data from large-scale containment experiments as shown in block 34. The large-scale containment experiments will include most, or all, of physical processes cataloged in the first step. In the preferred embodiment, the large-scale experiments are those listed in background section above, as shown in block 36. Through this comparison, the uncertainty bands for the combined processes investigated in the second step are tested. This part of the data processing assures that the composite modeling used to represent individual containment designs is in agreement with the observations from these appropriate large scale experiments and that the uncertainty or spectrum treated properly characterizes (straddles) the extent of experimental observations from the individual tests. If the uncertainty spectrum does not straddle the data, some physical processes are ill-characterized. At this stage, the process requires a re-examination of the data and determine what feature(s) has (have) been missed, as illustrated by block 38, and a return to the first step. In this regard, the process demands closure for the uncertainty evaluations, which is an essential part of the process. If the uncertainty boundaries are sufficient to bound the measured data in block 34, the uncertainties can be applied to the specific design that is to be evaluated, as shown in block 40.

The practical application of this method is to characterize the performance of current and future nuclear power plant containment structures. In particular, the containment structures are assessed in terms of their response to several different DBA accident conditions where the containment functions, including isolation, are characterized according to their technical specification. Through the processing of major experimental data, the assessment for the containment response can be evaluated in terms of the relevant experiments and the uncertainties associated with the physical behavior(s) identified (or confirmed) by the ensemble of experimental information relevant to the containment response. With this process, the technical specifications can be put on more rational (technically defensible) bases, which would substantially reduce the cost of maintaining the containment system including relevant emergency safeguard systems.

This invention provides several unique features including:
a) the quantification of individual model parameters (coefficients) for algorithms representing individual physical processes with the extensive experimental information published in the open literature and the available proprietary literature;
b) the characterization of the variations in these model parameters (coefficients) as best estimate, pessimistic, optimistic, high or low; and
c) the demand for closure on the set of physical processes that are to be modeled in representing containment behavior.

The criteria for closure requires that the uncertainty spectrum must straddle the major elements of the containment response, which are typically the containment pressure transient and temperature transients in various containment compartments. Through the closure process, one confirms that the major physical processes are represented. With this and the uncertainty spectrum, the response to specific accident conditions can be represented and with the uncertainty spectrum presented by the proposed mixing of best estimate, pessimistic, optimistic, high and low model parameters, an appropriate conservative assessment can be formulated for design basis evaluations. Through such an assessment, the conservative boundary to be used by regulatory agencies can be established on a rational basis, without being unduly conservative and therefore without forcing the expenditure of large amount of money to maintain containment equipment to unjustifiably conservative limits. However, for this to be accomplished, the closure demanded by this process must be achieved.

Through using the five different categories the influence of all uncertainties are efficiently considered; those which have a known effect on the final calculation and those whose effects are not as obvious. These uncertainty boundaries can be verified through Monte Carlo analyses when necessary but the five combination generally straddle the uncertainty boundaries from Monte Carlo studies.

As an example for the practical application of this process, consider the evaluation of the full scale German containment facility Heiss Dampf Reaktor (HDR) experiments for a small break Loss-Of-Coolant accident (LOCA). In this set of experiments, the potential for stratification of light gases (hydrogen) was investigated. This is also an important evaluation criteria for some current nuclear plant power containment designs. When applying the proposed methodology to this specific set of conditions, the major physical processes identified to be evaluated (the first step in the process) include: condensation on the containment walls, natural circulation flows throughout the various containment compartments, the rising of low density gaseous "plumes" when hydrogen is release into the containment, natural circulation cooling on the containment outer surface, cooling when external spray is used to cool the outside of the containment dome, and the thermal conduction of energy into the reinforced concrete structures which make up most of the containment inner and outer walls.

Each of these processes has a considerable experimental database, which needs to be evaluated and synthesized with the other phenomena to yield a usable product. Once the major phenomena are identified, available experiments from the literature are reviewed to determine: (a) the relative contributions of the above processes; and (b) the uncertainty boundaries. Those physical processes have dominant influences on this set of conditions where the natural circulation flows, including the countercurrent natural circulation flows that could occur when the high temperature gases are released into a room below the dome region. Furthermore, the potential for forming a "plume" of low density gases is also one of the controlling features. In this step, data from the open literature enables the uncertainties associated with these processes to be quantified. One of the most important features for these postulated accident conditions is the effect of thermal conductivity of the reinforced concrete structures, which is difficult to quantify for reinforced concrete. Here, a substantial uncertainty (a factor of 2) needs to be considered if the information associated with a particular concrete is not quantified.

The third step in the process is to determine the nature of the uncertainty boundaries. For this example, that boundary, which defines the highest containment pressure, would be the most pessimistic for this assessment with the lower value being taken as the optimistic boundary. For this example, it is not necessary to pursue a best estimate calculation, but in an actual application, such assessments would be made.

Figure 2:
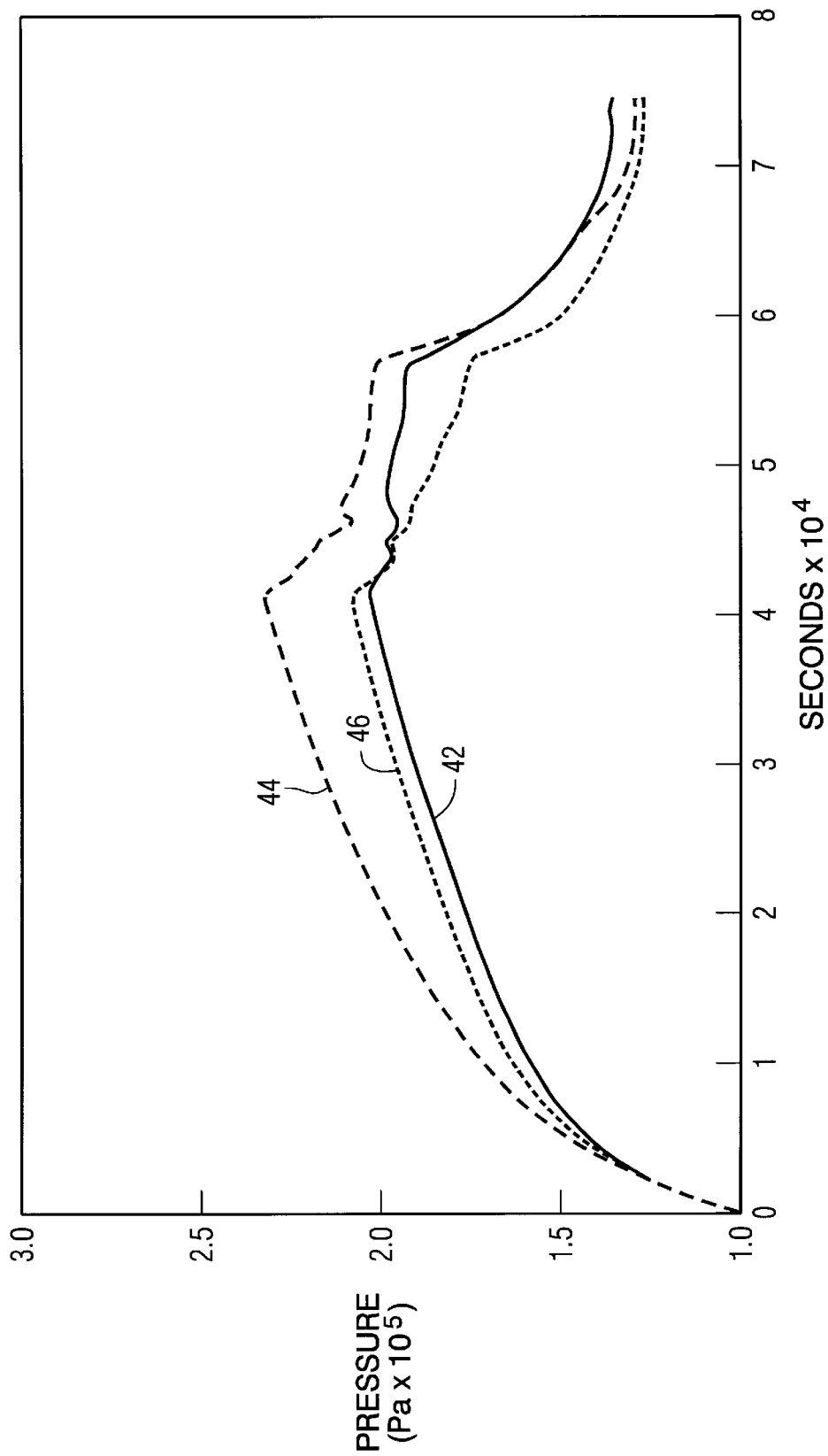
FIGS. 2 and 3 are graphs of containment structure pressure, showing example results obtained using the invention.

Through the use of these physical principles, including the uncertainty associated with the concrete thermal conductivity, the comparison of the integral calculation using the MAAP4 code can be tested with the data reported for the HDR small LOCA experiment (the fourth process step). It is noted that the MAAP4 code is not a part of the process. It is only the vehicle for application. The process can be applied using any computer code with similar capabilities. FIG. 2 is a graph on containment structure pressure that illustrates such a comparison (test) with the single uncertainty variation of a factor of 2 in the concrete effective thermal conductivity. In FIG. 2, curve 42 represents measured data. Curve 44 represents modeled data and curve 46 represents modeled data with the concrete in a containment structure doubled. This shows that the simple approach of varying this single parameter essentially brackets the measured data and provides a convenient means for such analyses to be generalized to nuclear power plants for small LOCAs. A complete evaluation considers several different accident conditions.

Figure 3:
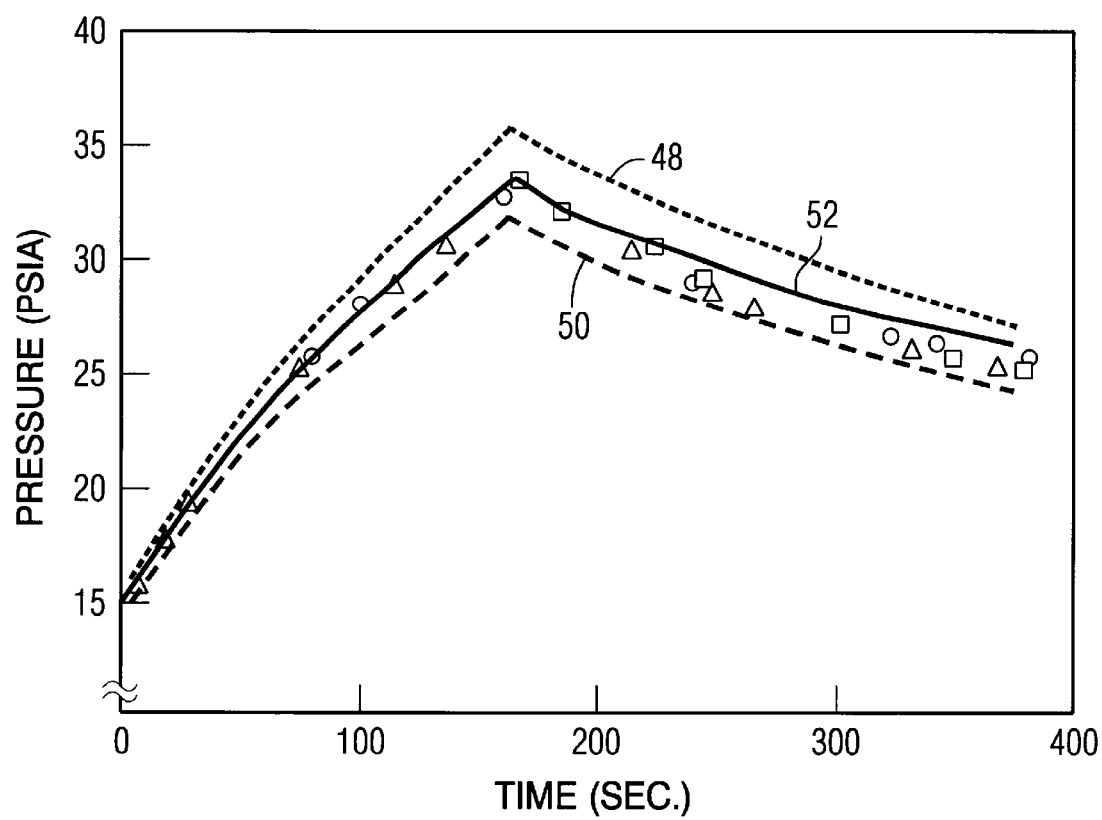

This invention has been applied to the comparison with the measured behavior for one of the CVTR large scale containment experiments (test 5 for steam condensation including the influence of containment sprays). FIG. 3 is a graph showing the containment pressure versus time results of this example. The pessimistic estimate is shown as line 48, while the opomistic estimate is shown as line 50 and the best estimate calculation is shown as line 52. This figure shows the experimentally measured containment building pressure as individual data points as individual squares, triangles and circles. All of the data points lie within the uncertainty boundaries. The capabilities for this structured approach to straddle the experimental measurements is well illustrated in this figure. This provides confidence that the process has ensured that all the important physical phenomena have been considered and that the uncertainties in these phenomena are also evaluated in a manner consistent with all the relevant technical knowledge.

Once such detailed physical descriptions are applied to most applicable nuclear power plant containment buildings (step five in the process), it is found that the potential for stratification of light gases is negligible because of the increased length (height) for mixing of the gases. Therefore, this process has the practical application of synthesizing these important physical observations and at the same time applying such a detailed understanding to the complex evaluations for nuclear power plants. Through such a process, the large database for evaluating such physical principles can be utilized and brought to bear on specific issues, which may, or may not, be a concern for nuclear power plant containments. By using this process, engineering resources can be effectively channeled to those issues where further work may be required and avoid the needless wasting of resources on issues where the extensive technical database, when properly developed through separate effects tests and qualified on large scale experiments like HDR, shows that such considerations are not important in nuclear power plant designs and/or operation.

While this example for HDR is relatively simple, it clearly illustrates the uniqueness of the proposed process. Specifically, closure of the uncertainty calculations is required and this results from demanding that the calculations "straddle" the measured behavior. While the example shows the measured containment pressure in a small LOCA transient and the uncertainty boundaries determined from best estimate physical descriptions plus the uncertainty boundaries for the effective thermal conductivity of the concrete, a similar comparison is done for the temperatures in the containment. These are of particular importance in establishing the environmental qualification conditions for operating components in the containment atmosphere. Hence, through this rational process the environmental qualification envelope for these components can be established in a manner that is consistent with the synthesized, technical basis including the experience from large scale containment experiments covering a wide range of accident conditions. Consequently, this important imposition of closure on the uncertainty processes is not only unique in terms of assuming that all the major physical processes are considered but is also unique in the manner that the extensive experimental data base is reduced to a usable set of conditions for nuclear power plant containment evaluations.

This process forces closure on all analytical representations such that meaningful experiments are not considered to be successfully represented by the analysis until the modeling calculations with uncertainties are demonstrated "to straddle the experimental results." By enforcing this criteria, the process is more stringent than that typically used in the nuclear industry today. Furthermore, it forces the analysts to continue investigating the comparison to determine if fundamental physical representations (models) are missing, until reasonable uncertainty bounds enable the model to "straddle the data." This is a unique limitation on the modification of analytical models, and computer codes. In essence, this process provides a mechanism for unifying the representation of all relevant experimental information, for a given application. Additionally, this then defines reasonable uncertainty boundaries. While the immediate application is containment analysis, the usefulness of the process is much greater than this single purpose.

The principle benefit is that the closure process for assuring that physical representations can "straddle the relevant data" to ensure that the fundamental physical processes involved in a technical evaluation are well characterized and represented. Furthermore, when this process is applied to the combination of separate effects tests and integral experiments, which is the specific application related to containment analyses, the process provides a means for unifying all of the relevant experimental information into well characterized analytical models with uncertainty boundaries. Moreover, the process enables an efficient evaluation of the influence for such uncertainty boundaries on integral analyses by characterizing these boundaries as either optimistic or pessimistic, where such characterizations are clear, or high and low when they are not clear. An important benefit of the invention is to provide a structured process that rationalizes (draws together) all of the relevant experimental information such that realistic technical evaluations can be performed, implemented and defended.

This invention provides a unique means of assimilating, understanding and applying the technical knowledge base to the design and licensing of nuclear power plant containment buildings. The method results in a mathematical model having parameters with uncertainty boundaries that encompass available experimental data. This mathematical model can then be used to evaluate containments for nuclear power plants.

While the present invention has been described in terms of what is at present believed to be its preferred embodiment, it will be apparent to those skilled in the art that various changes can be made to the described embodiment without departing form the scope of the invention as defined by the following claims.

What is claimed is:

1. A structured method of evaluating design basis accident parameters that will impact nuclear power plant containment designs, the method comprising the steps of:

assembling a first database of test results;

selecting a model for identifying the design basis accident parameters applicable to specific type of nuclear power plant containment design to be evaluated;

comparing a first set of results of the model to test results in the first database of test results;

establishing uncertainty boundaries for the first set of results of the model;

assembling a second database of test results;

determining whether the test results of the second database are within the uncertainty boundaries of the model; and evaluating an actual or proposed containment building design based upon the results of the model when test results of the second database of test results are within the uncertainty boundary.

2. The method of claim 1, wherein:

the test results of the first database of test results relate to a portion of a containment building design; and the test results of the second database of test results relate to multiple portions of a containment building design.

3. The method of claim 2, wherein when the test results of the second database are not within the uncertainty boundaries of the model, the method includes the additional steps of:

establishing revised uncertainty boundaries for the first set of results of the model; and determining whether the test results of the second database are within the revised uncertainty boundaries of the model.

4. The method of claim 1, wherein when the test results of the second database are not within the uncertainty boundaries of the model, the method includes the additional steps of:

establishing revised uncertainty boundaries for the first set of results of the model; and determining whether the test results of the second database are within the revised uncertainty boundaries of the model.

5. The method claim 1 wherein the first database of test results includes results of specific effects tests on partial structures or simulated partial structures of the containment building design.

6. The method claim 5 wherein the second database of test results includes results of large scale tests on multiple partial structures or multiple simulated partial structures of the containment building design.

7. The method claim 1 wherein the second database of test results includes results of large scale tests on multiple partial structures or multiple simulated partial structures of the containment building design.

8. The method claim 1 wherein the second database of test results includes results of large scale tests on the entire containment building design.

9. The method of claim 1 wherein the first database of test results includes results of specific effects tests on individual design basis accident phenomenon.

10. The method of claim 1 wherein the second database of test results includes results of large scale tests on multiple design basis accident phenomenon.

* * * * *